United States Patent [19]

Reeder

[11] Patent Number: 4,794,494
[45] Date of Patent: Dec. 27, 1988

[54] DAYTIME ILLUMINATION DEVICE FOR A MOTOR VEHICLE

[75] Inventor: Frank J. Reeder, Charlotte, N.C.

[73] Assignee: Anzonia M. Marsh, Charlotte, N.C.

[21] Appl. No.: 114,084

[22] Filed: Oct. 27, 1987

[51] Int. Cl.⁴ .............................................. B60Q 1/00
[52] U.S. Cl. ........................................ 362/61; 362/72;
362/80; 362/84; 362/293; 362/290; 362/321;
362/325
[58] Field of Search ...................... 362/61, 72, 80, 84,
362/255, 256, 266, 268, 281, 283, 282, 284, 290,
293, 321, 325

[56] References Cited

U.S. PATENT DOCUMENTS

| | | | |
|---|---|---|---|
| 1,100,484 | 6/1914 | Inman | 362/284 |
| 1,141,124 | 6/1915 | Kobs, Jr. et al. | |
| 1,178,292 | 4/1916 | Brandquist | |
| 1,193,942 | 8/1916 | Starkweather et al. | |
| 1,199,534 | 9/1916 | Ernst | |
| 1,236,966 | 8/1917 | Minetti et al. | 362/325 |
| 1,483,616 | 2/1924 | Robinson | 362/325 |
| 1,725,117 | 8/1929 | Walthers | 362/325 |
| 1,797,881 | 3/1931 | Schoen | 362/325 |
| 2,119,370 | 5/1938 | Van Leunen | |
| 2,699,536 | 1/1955 | Roth et al. | 362/290 |
| 4,382,272 | 5/1983 | Quella et al. | 362/84 |

FOREIGN PATENT DOCUMENTS 592811  5/1925  France ................. 362/283

Primary Examiner—Ira S. Lazarus
Assistant Examiner—Sue Hagarman
Attorney, Agent, or Firm—Bell, Seltzer, Park & Gibson

[57] ABSTRACT

A daytime headlight illumination device carried by a motor vehicle such as a motorcycle or a car for better visibility thereof to other motor vehicles comprising a motor vehicle headlight assembly including a light source and a headlight lens and a shutter assembly located directly in front of the headlight lens and in the path of light rays originating from the light source, the shutter assembly including a plurality of fluorescently colored movable shutter blades and means for moving the shutter blades between an open position for use during nighttime wherein the light rays are passing through only the headlight lens and a closed position for use during daytime wherein the light rays are passing through the headlight lens and the fluorescently colored shutter blades so as to make the motor vehicle carrying the device highly visible during the daytime.

8 Claims, 1 Drawing Sheet

DAYTIME ILLUMINATION DEVICE FOR A MOTOR VEHICLE

FIELD AND BACKGROUND OF THE INVENTION

The present invention relates to an illumination device for use on a motor vehicle for better visibility thereof during the daytime.

During the daytime hours, drivers of motor vehicles ordinarily do not use their headlights because sunlight is sufficient to illuminate the path of travel. It is often difficult, however, for other vehicles to see the vehicle during these hours because of the glare of the sun and due to the inattentiveness of many drivers. This is especially true of motorcycles in that, because of their smaller size as compared to cars, it is easy for other drivers not to see them at all. Thus a better method of daytime illumination for all motor vehicles, and particularly motorcycles, is desired.

There are various attachments to headlights to change the illumination thereof. For example, U.S. Pat. No. 1,199,534 to Ernst discloses using colored distendable sacks which are filled to dim the lights or which can be colored to provide a signal. U.S. Pat. No. 2,119,370 to Van Leunen discloses a lens unit which employs a series of shutter plates and rib-like refracting lenses located between the front lens and the light source to reduce glare and permit selective dimming of the light. U.S. Pat. No. 2,699,536 to Roth et al discloses a light system for a train which utilizes a series of movable lenses which can be adjusted to change the size of the light beam, the intensity of the beam and the direction of the beam. Additionally, a colored lens such as a red lens can be employed as a signal. These devices, however, do not sufficiently improve the illumination of the headlight so as to improve visibility during the daytime. Moreover, the overall size and complexity of these devices make them impractical to install as part of a headlight assembly of a vehicle.

SUMMARY OF THE INVENTION

In accordance with the present invention, applicant provides a daytime headlight illumination device carried by a motor vehicle for better visibility thereof to other motor vehicles. To this end, the illumination device comprises a headlight assembly having a light source and a headlight lens and a shutter assembly located directly in front of the headlight lens and in the path of light rays originating from the light source. The shutter assembly includes a plurality of fluorescently colored movable shutter blades and means for moving the shutter blades between an open position for use during nighttime wherein the light rays are passing through only the headlight lens and a closed position for use during daytime wherein the light rays are passing through the headlight lens and the fluorescently colored shutter blades. This makes the motor vehicle carrying the illumination device highly visible to other vehicles during the daytime, thereby providing a safety feature to the vehicle.

BRIEF DESCRIPTION OF THE DRAWINGS

The foregoing and other objects, features and advantages of the present invention will be made apparent from the following detailed description of preferred embodiments of the invention, and from the drawings, in which.

DETAILED DESCRIPTION OF THE INVENTION

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

Figure 1:
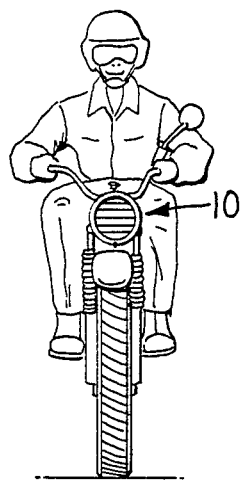
FIG. 1 is a perspective view of a motorcycle with an embodiment of the invention carried thereby.

A daytime headlight illumination device, carried by a motor vehicle such as a motorcycle or car is illustrated in the Figures. The illumination device is particularly suited for use with the headlight assembly of a motorcycle such as shown in FIG. 1. The illumination device offers improved visibility of the vehicle to other vehicles during the daytime.

As illustrated in the Figures, the daytime headlight illumination device, generally indicated by the reference numeral 10, comprises in combination a motor vehicle headlight assembly 20 and a shutter assmmbly 30. Turning now to the specific aspects of the illumination device 10, the present invention will be discussed in detail hereinafter.

Figure 3:
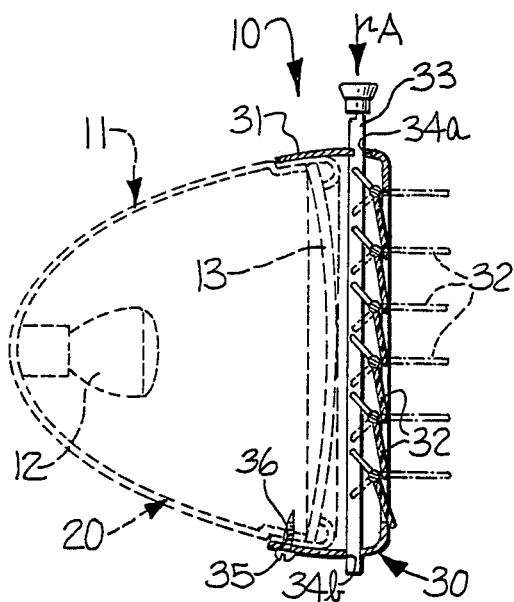
FIG. 3 is a longitudinal sectional view taken along line 3—3 of FIG. 2.

The motor vehicle headlight assembly 20 can be any of a number of typical headlight constructions and, as shown in FIG. 3, includes a light housing 11, a light source 12 and a lens unit 13. The light source 12 is a standard electric bulb which provides a bright light ray or beam, but at the same time is small in size in order to fit in the headlight assembly. The lens unit 13 is made of clear glass or plastic and functions as a light diffuser in that the light rays from the light source 12 are distributed so that the zone on each side of the vehicle and the zone directly in front of the vehicle are illuminated. This diffusion, however, reduces the brightness of the light rays especially in daylight, and the light is poorly visible during the day.

Figure 2:
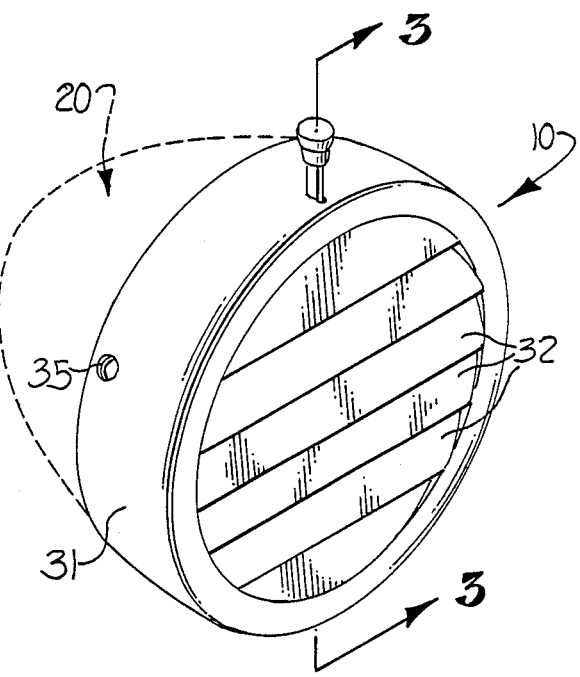
FIG. 2 is an enlarged perspective view of an embodiment of the present invention wherein the shutter blades are positioned horizontally.
Figure 5:
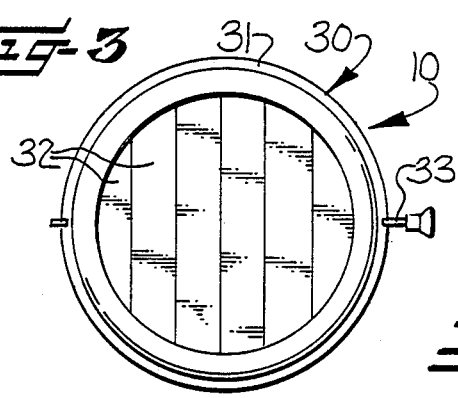
FIG. 5 is an enlarged perspective view of another embodiment of the present invention wherein the shutter blades are positioned vertically.

The shutter assembly 30 of the present invention provides a way for improving this visibility. The shutter assembly 30 is located directly in front of the lens unit 13 and is directly in the path of rays originating from the light source 12. The shutter assembly includes a mounting rim 31 and a plurality of fluorescently colored blades 32 or shutters. The blades 32 can be arranged horizontally and parallel to each other as shown in FIG. 2, or the blades 32 can be arranged vertically and parallel to each other as shown in FIG. 5.

The light rays from the light source 12 are shone through the fluorescently colored, transparent blades 32 to improve the illumination and visibility thereof. This occurs due to the ability of the colored blades to impart a much brighter and glowing color, typically orange or yellow, to the normally drab white incandescent light of the light source 12. The brighter and glowing color results from utilizing fluorescent pigments or fluorescent materials such as organic polynuclear hydrocarbons on the blades 32 or in the blade coloring. This glowing effect of the color results from the fluorescent pigments or fluorescent materials exhibiting the property of photoluminescence. Photoluminescence occurs when a source of photons such as the light rays of the light source 12 strike a fluorescent material. After being struck by the photons, the fluorescent material emits light at a different wavelength than the wavelength of the incident light ray. The emitted light is the color that the particular fluorescent material happens to emit, and for purposes of the present invention materials emitting orange or yellow-colored light are desired. The emitted light tends to glow more than the incandescent light of the light source, and because the selected orange or yellow color is easier to see, the light produced is vibrant and highly visible. The key is that the light, after passing through the transparent blades, is bright, and a vehicle carrying the shutter assembly 30 is highly visible and easier to be seen by other vehicles during the day.

Figure 4:
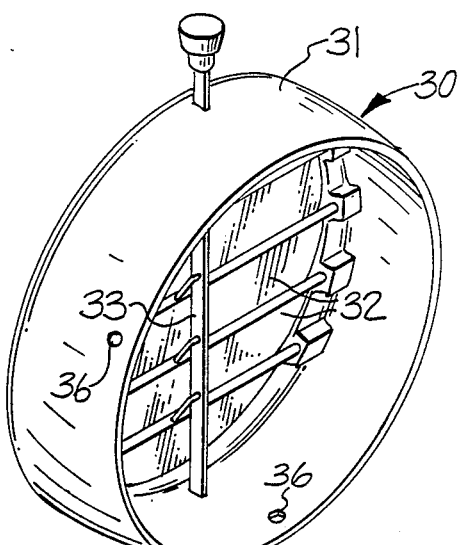
FIG. 4 is an enlarged perspective view of the rear portion of the shutter assembly of an embodiment of the present invention.

The blades 32 are movable and may be mounted to do so in any suitable manner, and as shown in FIGS. 3 and 4, the blades 32 are connected to a movable actuating rod 33 by a tongue 34. The movable actuating rod 33 is received in a pair of opposing transversely aligned openings 34a, 34b provided in the shutter assembly housing 31, and when pushed downward in direction A, the blades 32 are moved to an open position. When pulled upward, the blades 32 are moved to a closed position such as shown in FIG. 2.

The shutter assembly 30 is mounted to the headlight assembly by the use of set screws 35 positioned in apertures 36 in the mounting rim 31 of the shutter assembly 30. The shutter assembly 30 can then be adapted to be mounted on a variety of headlight assembly 20 sizes and shapes.

In operation, the shutter blades 32 are moved to an open position for use during nighttime so that the light rays are passing only through the headlight lens unit 13 in that in the dark the illumination of the headlight does not need to be enhanced. During daytime, the blades 32 are moved to a closed position so that the light rays are passing through headlight lens and then through the fluorescently colored translucent shutter blades thereby making the light rays more visible and the vehicle carrying the shutter assembly 30 highly visible during the daytime.

In the drawings and specification, there have been disclosed typical preferred embodiments of the invention and, although specific terms are employed, they are used in a generic and descriptive means only and not for purposes of limitation, the scope of the invention being set forth in the following claims.

That which is claimed is:

1. A daytime headlight illumination device carried by a motor vehicle such as a motorcycle or a car for better visibility thereof to other motor vehicles, said device comprising in combination;
   a motor vehicle headlight assembly including a light source and a headlight lens and
   a shutter assembly located directly in front of the headlight lens and in the path of light rays originating from said light source; said shutter assembly including a plurality of fluorescently colored movable shutter blades, said fluorescently colored blades exhibiting photoluminescence so as to provide enhanced light emission over a given wavelength range, and means for moving said shutter blades between an open position for use during nighttime wherein the light rays are passing through only said headlight leans and a closed position for use during daytime wherein the light rays are passing through the headlight lens and said fluorescently colored shutter blades so as to make the motor vehicle carrying said device highly visible during the daytime.

2. A daytime headlight illumination device according to claim 1 wherein said shutter assembly includes a mounting rim for mounting said shutter assembly on a variety of headlight assembly sizes and shapes.

3. A daytime headlight illumination device according to claim 1 wherein the plurality of said fluorescently colored shutter blades are horizontally oriented and parallel to each other.

4. A daylight illumination device according to claim 1 wherein said shutter assembly includes an actuating rod cooperating with said means for moving said shutter blades.

5. A daylight illumination device according to claim 1 wherein the plurality of said fluorescently colored shutter blades are vertically oriented and parallel to each other.

6. A daytime headlight illumination device carried by a motor vehicle such as a motorcycle or a car for better visibility thereof to other motor vehicles, said device comprising in combination:
   a motor vehicle headlight assembly including a light source and a headlight lens and
   a shutter assembly located directly in front of the headlight lends and in the path of light rays originating from said light source; said shutter assembly including a plurality of fluorescently colored horizontally oriented movable shutter blades parallel to each other and means for moving said shutter blades between an open position for use during nighttime wherein the light rays are passing through only said headlight lens and a closed position for use during daytime wherein the light rays are passing through the headlight lens and said fluorescently colored shutter blades so as to change the white light of the light rays into a more easily seen and brighter color thereby making the motor vehicle carrying said device highly visible during the daytime.

7. A daytime headlight illumination device according to claim 6 wherein said shutter assembly includes a mounting rim for mounting said shutter assembly on a variety of headlight assembly sizes and shapes.

8. A daylight illumination device according to claim 6 wherein said shutter assembly includes an actuating rod cooperating with said means for moving said shutter blades.

* * * * *